United States Patent [19]
Hoffman et al.

[11] Patent Number: 5,337,884
[45] Date of Patent: Aug. 16, 1994

[54] LUBRICATION SYSTEM FOR A CONVEYOR BELT

[75] Inventors: Philip L. Hoffman, Medford; Richard J. Signorello, Grants Pass, both of Oreg.

[73] Assignee: Simco/Ramic Corporation, Medford, Oreg.

[21] Appl. No.: 105,313

[22] Filed: Aug. 9, 1993

[51] Int. Cl.$^5$ ............................................. B65G 45/02
[52] U.S. Cl. ..................................... 198/500; 198/811
[58] Field of Search ......................... 198/495, 500, 811

[56] References Cited

U.S. PATENT DOCUMENTS

| | | | |
|---|---|---|---|
| 2,066,206 | 12/1936 | Laurie . | |
| 2,541,403 | 2/1951 | Carl . | |
| 2,548,739 | 4/1951 | Peck . | |
| 2,604,199 | 7/1952 | Govan . | |
| 2,670,069 | 2/1954 | Dobkin . | |
| 2,759,606 | 8/1956 | Nippert | 210/1.5 |
| 2,800,199 | 7/1957 | Mlynarek | 184/16 |
| 3,025,828 | 3/1962 | Heilman | 118/63 |
| 3,343,480 | 9/1967 | Van Hartesveldt et al. | 100/93 |
| 3,799,401 | 3/1974 | Braun et al. | 222/109 |
| 4,116,162 | 9/1978 | Dinter et al. | 118/104 |
| 4,494,648 | 1/1985 | Held | 198/500 |
| 4,934,512 | 6/1990 | Lin et al. | 198/495 |
| 4,976,342 | 12/1990 | Hwang | 198/495 |
| 4,982,686 | 1/1991 | Long | 118/406 |
| 5,076,200 | 12/1991 | Mayer et al. | 118/126 |
| 5,133,996 | 7/1992 | Busker | 427/356 |
| 5,173,120 | 12/1992 | Suzumura et al. | 118/410 |

*Primary Examiner*—Cheryl L. Gastineau
*Attorney, Agent, or Firm*—Stoel Rives Boley Jones & Grey

[57] ABSTRACT

An optical inspection system (10) has a conveyor belt (18) that turns at a non-rotating turning bar (22). An inner surface (20) of the conveyor belt contacts a turning surface (22T) of the turning bar. A reservoir (60) for holding a lubricant (62), such as water, is formed by a free surface (22F) of the turning bar, two reservoir side walls (54, 56), a free surface (52F) of a feed bar (52), and a lower surface (58). The feed bar has orifices (69) for discharge of the lubricant into the reservoir and is connected to a source of lubricant subject to volume regulation. When the conveyor belt is in operation, the volume of lubricant supplied to the reservoir keeps the line of contact (22L) between the inner surface and the turning surface covered with lubricant. Rods (64, 66) regulate the flow of lubricant so as to maintain adequate coverage with lubricant of the region (46) where the conveyor belt turns over the turning bar and of the line of contact between the inner surface and the turning surface. The top (22H) of the turning bar is a distance (H) lower than the common level of the top (52H) of the feed bar, the top of the side walls, and the tops (64H, 66H) of the rods. The volume of lubricant supplied to the reservoir through the orifices is regulated so that the supply slightly exceeds the outflow of lubricant between the inner surface and the turning bar.

19 Claims, 3 Drawing Sheets

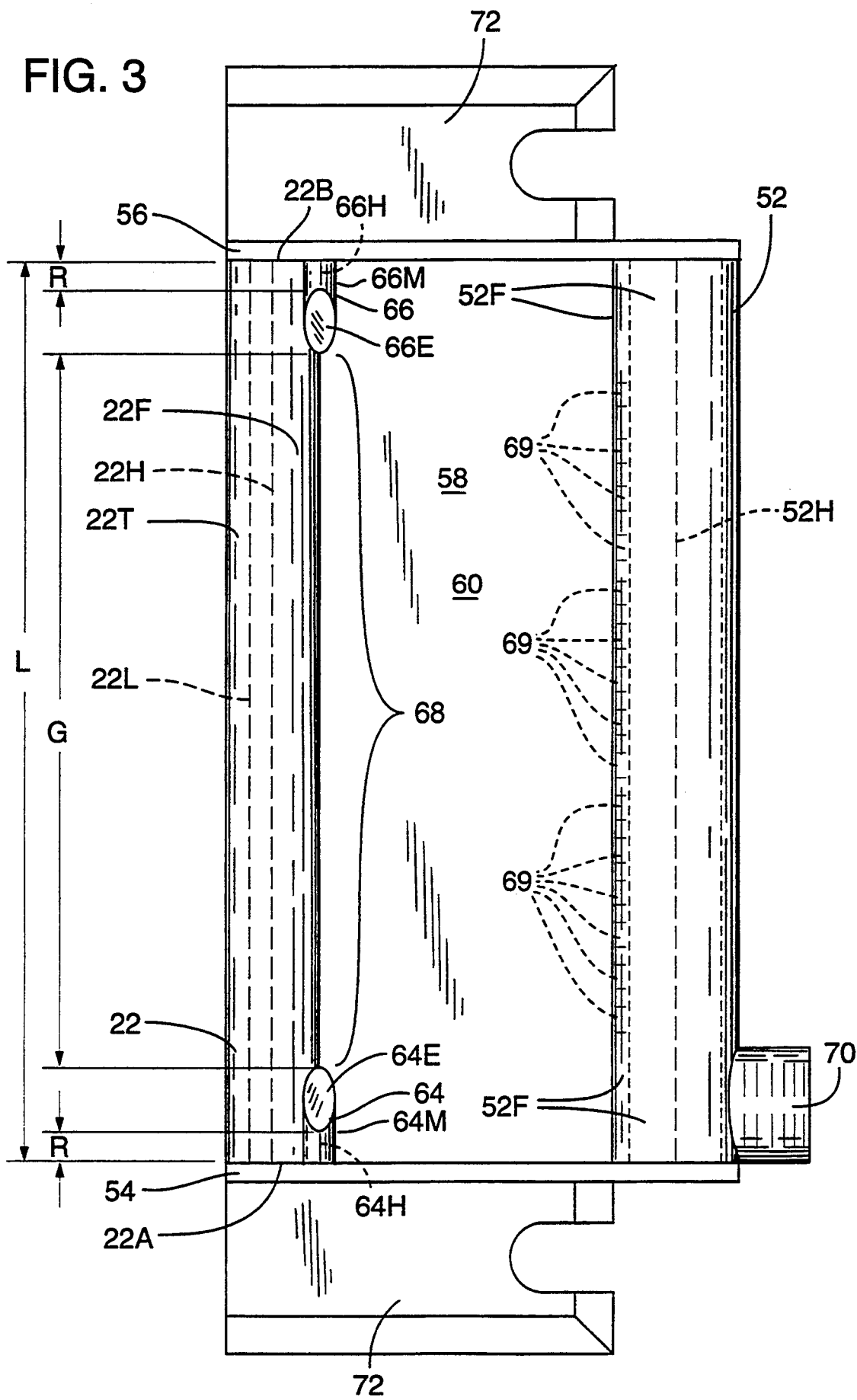

LUBRICATION SYSTEM FOR A CONVEYOR BELT

TECHNICAL FIELD

The present invention pertains to conveyor belt lubrication systems, particularly to those useful for optical inspection systems such as automated bulk processing systems.

BACKGROUND OF THE INVENTION

Optical inspection systems such as automated bulk processing systems are used for determining optical characteristics of articles. The optical characteristics may be determined at a wavelength visible to the human eye or at a wavelength not visible to the human eye. Optical inspection systems can perform a variety of tasks such as inspecting or sorting bulk articles including raw or processed fruit, vegetables, wood chips, recycled plastics, and other similar products. The systems can rapidly separate very large quantities of articles into different categories.

The articles are placed on a conveyor belt and moved by the conveyor belt past an inspection station, which inspects the articles for optically-detectable characteristics such as size, color, or shape. The inspection station sends signals to a sorting or treatment station where the articles are sorted or treated by category based on optical characteristics of the articles detected by the inspection station. One type of treatment is to remove defective or foreign articles from the flow of articles carried by the conveyor.

In a particularly effective method of removing defective or foreign articles, the conveyor belt moves rapidly, supporting the flow of articles on its upper surface, in one direction toward a turning bar. At the turning bar the conveyor belt turns sharply downward to return in an endless loop to other parts of the system. Where the conveyor belt turns downward, the articles continue to move forward in the direction in which the conveyor belt had been conveying them; thus, the articles are projected from the point where the conveyor belt turns and travel through the air following an approximately ballistic trajectory. The treatment station is located in a treatment region through which the articles travel. While a defective or foreign article is travelling through the treatment region, the treatment station directs an accurately timed blast of a fluid, such as water or compressed air, at that article. The blast of fluid directs that article out of the trajectory followed by acceptable articles and toward a rejection bin or other suitable means for collecting it. Acceptable articles are not struck by a blast of fluid and continue on their trajectory toward a bin or other suitable means for collecting them.

FIG. 1 is a fragmentary, partly sectional, and partly schematic elevation view of part of an optical inspection system or automated bulk processing system 10 designed for sorting articles 12 such as whole potatoes. Articles 12 travel in a direction 14 on an outer surface 16 of a conveyor belt 18 until the inner surface 20 of conveyor belt 18 contacts a turning surface 22T of a turning element 22. At or near that point, conveyor belt 18 turns sharply away from articles 12 to run back as an endless loop to other parts of the system. Articles 12 continue to move and travel on an initial trajectory 24 through a desired region 26. Conveyor belt 18 is supported over most of its length by a support sheet 28 and is driven by a drive roller (not shown) that pulls conveyor belt 18 over and away from turning element 22. Support sheet 28 has a gently dimpled (not shown) surface 28S that contacts surface 20.

Articles 12 are optically inspected at an inspection region 30 while travelling past an inspection station or stations 32 located either above surface 20 or above and/or below trajectory 24 in region 26. At inspection station 32, articles 12 are illuminated so that cameras or other optical detection devices at inspection station 32 can view the illuminated articles 12 and a logic unit or controller can determine characteristics of articles 12 based on the optical information. Commands based on the optical inspection are sent by a control unit to a treatment station 34 in a treatment region 36, where selected articles 12 are treated, e.g., removed from the stream of acceptable articles (as shown) or cut or otherwise processed. To remove unacceptable articles, for example, a blast 38 of a fluid such as compressed air or water is directed at foreign or defective articles 12S while they are moving through treatment region 36. Blast 38 impels foreign or defective articles 12S to follow a rejection trajectory 40 away from a trajectory 42 (which is typically a continuation of initial trajectory 24) followed by acceptable articles 12U.

The effectiveness of bulk processing systems such as system 10 is affected by the extent to which initial trajectory 24 is predictable. To achieve greater predictability of initial trajectory 24, turning element 22 has a turning surface 22T that allows conveyor belt 18 to move down from articles 12 in a short distance and thus that allows a high radial acceleration of surface 16 away from articles 12. Turning surface 22T thus has a relatively small radius of curvature. It would be difficult to support a small-radius rotating turning element such as a roller over the width of conveyor belt 18 while avoiding unacceptable flexing of such a roller. Thus, turning element 22 is generally provided as a rounded, fixed, non-rotating turning bar or nose bar or bullnose rather than a roller. Turning element or turning bar 22 is supported against the force exerted on it by conveyor belt 18 by a support bar 23 extending along the length of turning bar 22.

Conveyor belt 18 typically moves at such a high speed (for example, 500 feet (approximately 152 meters) per minute) that substantial heat can be generated by friction between inner surface 20 of conveyor belt 18 and turning surface 22T. To reduce the friction between those two surfaces, to dissipate some of the heat generated by the friction, and to reduce wear on those two surfaces, a lubricant such as water is conventionally applied to those surfaces where they meet.

FIG. 1 shows a conventional method of applying the lubricant. A spray pipe 44 extends across the width of conveyor belt 18 and parallels a region 46 where inner surface 20 meets turning surface 22T and where conveyor belt 18 thus turns around turning bar 22. Pipe 44 has holes bored in it, or nozzles attached to it, that direct a spray 48 of pressurized water into region 46. Some of the resulting water adheres to and lubricates surfaces 20 and/or 22T, but most of it drips or flows away from region 46 as wasted water 50 or sprays out from system 10 and thus also is wasted. Most of wasted water 50 is carried away from turning bar 22 on surface 20 as conveyor belt 18 moves through system 10. As a result, much more water falls around and below turning bar 22 and in other areas to which surface 20 carries it than was actually needed to lubricate surfaces 20 and 22T.

The spray system has serious disadvantages. Spray 48 ordinarily does not uniformly coat inner surface 20 where it meets turning surface 22T. This causes an uneven reduction in friction, an uneven degree of cooling, and an uneven reduction of wear across the width of conveyor belt 18 on surface 20. As a result, conveyor belt 18 experiences uneven thermal stress and/or wear and may break sooner than if it had received the lubricating water uniformly. The spray system also wastes water, which must be not only supplied to the spray system but also removed from the vicinity of the inspection system.

There is thus a need for a lubricating system for region 46 that will apply a lubricant such as water uniformly across the width of surfaces 20 and 22T and that requires less water throughput than the spray system.

SUMMARY OF THE INVENTION

An object of the present invention is, therefore, to provide for an optical inspection system an apparatus for uniformly lubricating the area where the inner surface of a conveyor belt contacts the turning surface of a turning bar.

Another object of this invention is to provide for an optical inspection system an apparatus for economically supplying a lubricant to the area where the inner surface of a conveyor belt contacts the turning surface of a turning bar.

In one aspect of the invention, an inspection system according to the invention is operable to determine characteristics of articles in motion through an inspection region according to automated analysis of optical characteristics of the articles and to treat in a treatment region selected ones of the articles determined to have predetermined optical characteristics. The system has a turning bar disposed adjacent the treatment region and having a turning surface and a conveyor belt operable to cause the articles to move in a movement direction through the inspection region. The conveyor belt has an outer surface for supporting the articles and an inner surface that contacts the turning region.

A plurality of barriers, together with a free surface of the turning bar, defines a lubricant reservoir disposed adjacent the turning bar and the inner surface. The system includes means, such as a plurality of orifices disposed below the surface of lubricant contained in the reservoir, for supplying lubricant to the reservoir in sufficient quantity to fill the reservoir to above the top of the turning bar and to replace lubricant entrained at the contact line between the inner surface and the turning surface or lost during operation of the system. The contact line is submerged in the lubricant during operation. As a result, the inner surface is in contact with the lubricant at the contact line throughout the length of the inner surface.

In another aspect of the invention, an inspection system is operable to determine characteristics of articles in motion through an inspection region according to automated analysis of optical characteristics of the articles and to transfer the articles through a desired region. The system has a turning bar disposed adjacent the desired region and having a turning surface and a conveyor belt operable to cause the articles to move in a movement direction through the desired region. Other features of the invention described above are also present in this second aspect of the invention.

In either aspect, the invention defines a reservoir for containing lubricant at a level higher than the top of the turning bar. As a result, lubricant flows over the top of the turning bar and floods the contact line between the inner surface of the conveyor belt and the turning surface of the turning bar. The tendency of the lubricant in the reservoir to drain down to the level of the top of the turning element is partly offset by the inner surface of the conveyor belt, which blocks the lubricant from draining over most of the width of the turning bar, and also by baffles or level control rods, which block the lubricant from draining over the parts of the width of the turning bar that are not covered by the conveyor belt. A small amount of lubricant will drain from the region near the contact line, below the top of the turning bar, and below the baffles or level control rods. However, such drainage is much less than the amount of lubricant wasted in a spray system. Loss of lubricant through such drainage and through entrainment between the inner surface of the conveyor belt and the turning surface of the turning bar is replaced by flow of lubricant into the reservoir.

By providing sufficient lubricant to fill the reservoir to above the top of the turning bar, the invention assures uniform application of a lubricant, such as water, to those surfaces. Moreover, the invention provides uniform application of lubricant with substantially less lubricant throughput than required to operate a spray system.

Additional objects and advantages of the present invention will be apparent from the detailed description of preferred embodiments thereof, which proceeds with reference to the accompanying drawings.

BRIEF DESCRIPTION OF THE DRAWINGS

FIG. 3 is a fragmentary plan view of the part of the automated bulk processing system shown in FIG. 2, with conveyor belt 18 and a lubricant removed, and showing the side walls.

DETAILED DESCRIPTION OF THE PREFERRED EMBODIMENT

Figure 2:
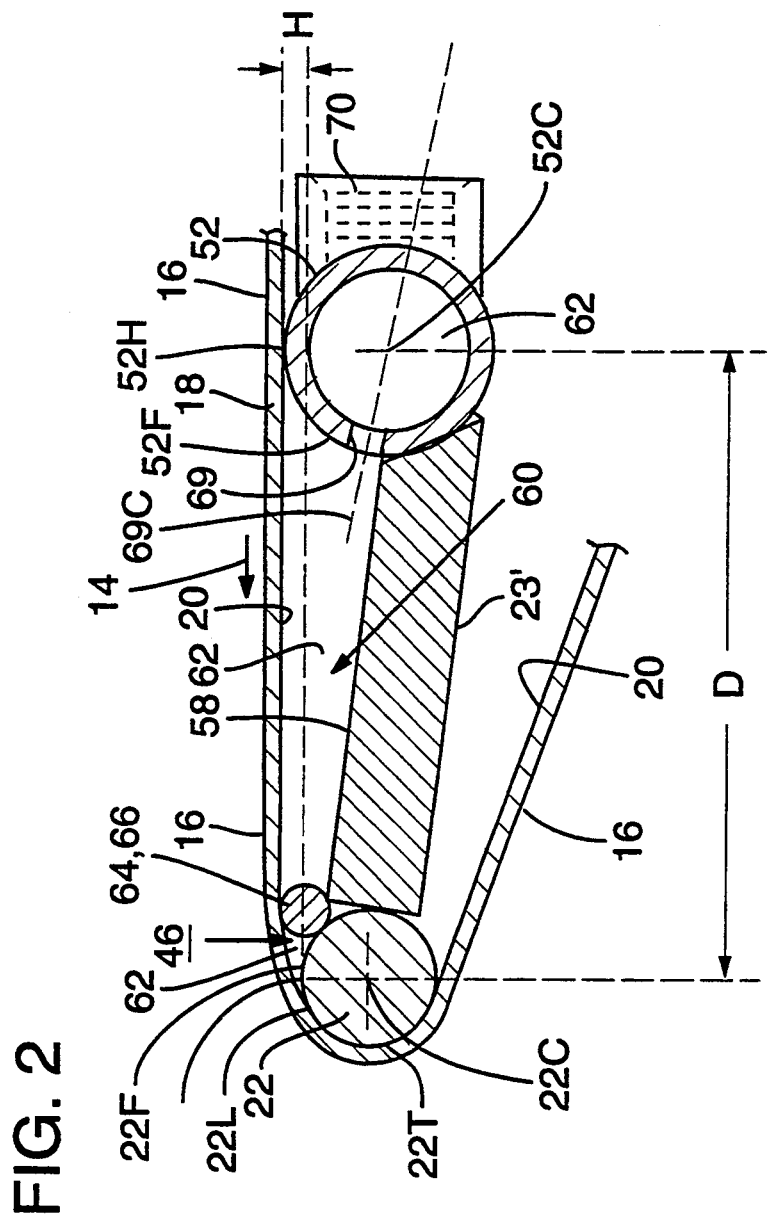
FIG. 2 is an enlarged fragmentary, partly sectional, and partly schematic elevation view of part of an automated bulk processing system including a lubrication system according to the invention, with two side walls removed.

With reference to FIGS. 2–3, a lubricant feed bar 52 extends transverse to the direction 14 of movement of conveyor belt 18. Feed bar 52 has a free surface or back wall 52F which, together with first and second side walls 54 and 56 (FIG. 3), a lower surface 58 defined by a surface of a support bar 23', and a free surface 22F of turning element or turning bar 22, defines a reservoir 60 for containing lubricant 62, which is conventionally water. Free surface 22F extends from the top 22H of turning bar 22 to the junction between turning bar 22 and lower surface 58. Top 52H of feed bar 52 is located a first distance or distance H (FIG. 2) above top 22H of turning bar 22. Side walls 54 and 56 (FIG. 3) extend from feed bar 52 to turning bar 22 and extend upward at least to surface 20. The tops of side walls 54 and 56 follow the contour of inner surface 20 of conveyor belt 18 when it is in operation. Preferably the tops of side walls 54 and 56 are flush with that contour (e.g., flush with the top of rods 64 and 66) so that the tops of side walls 54 and 56 present less risk of cutting surface 20. Turning bar 22 is levelled before operation so that each of its ends 22A and 22B (FIG. 3) is level with the other. Feed bar 52, side walls 54 and 56, and containment baffles or level control rode 64 and 66 are installed so that each end of feed bar 52 is level with the other, with the tops of side walls 54 and 56, and with the tops 64H and 66H of rods 64 and 66 when ends 22A and 22B are level with each other. The level of top 22H of turning bar 22 is thus the distance H below the common level of each of the top 52H of feed bar 52, the tops of side walls 54 and 56, and the respective tops 64H and 66H of rods 64 and 66. The centerline 22C of turning bar 22 and the centerline 52C of feed bar 52 are separated by a distance D.

Feed bar 52 has a plurality of orifices 69 spaced along its length. Water 62 enters feed bar 52 through a connection or threaded fitting 70 to which is connected a source of water controlled by a valve for adjusting the flow of water into and through feed bar 52.

Figure 1:
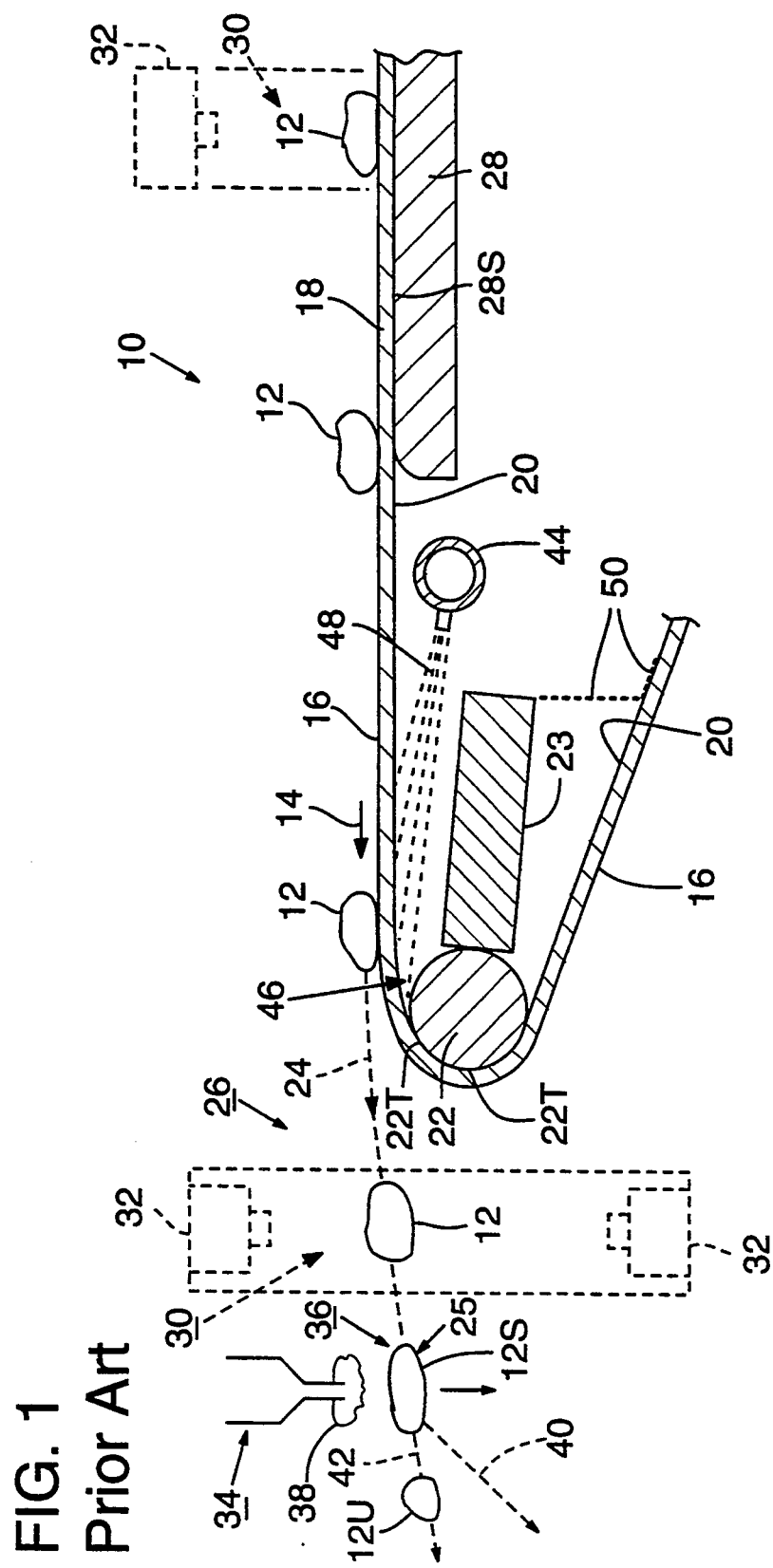
FIG. 1 is a fragmentary, partly sectional, and partly schematic elevation view of part of an automated bulk processing system equipped with a spray system.

Rods 64 and 66 extend from respective sides 22A and 22B of turning bar 22, and from respective side walls 54 and 56, in toward the center of turning bar 22 and have respective tops 64H and 66H. Surface 20 slides lightly over tops 64H and 66H, and over top 52H of feed bar 52, when conveyor belt 18 is moving at normal operating speed. Conveyor belt 18, when moving at normal operating speed, tends to rise up (as shown in FIGS. 1–2) over region 46 above the top of turning bar 22. System 10 is appropriately designed and levelled so that, in operation, top surface 16 of conveyor belt 18 is level except where it begins to turn around turning bar 22. As described above, tops 64H and 66H are above the level of top 22H of turning bar 22; thus, when conveyor belt 18 is not in operation, rods 64 and 66 push small parts of surface 20 up by as much as the distance H.

Conveyor belt 18 typically has a width (not shown) transverse to movement direction 14 that is less than the length L (FIG. 3) of turning bar 22, lower surface 58, and feed bar 52. That lesser width allows conveyor belt 18 to slide to a limited extent transverse to direction 14 along the width of turning bar 22 when conveyor belt 18 is moving at operating speed. Rods 64 and 66 each have a length R (FIG. 3) sufficiently long that their respective main portions 64M and 66M (i.e., the portions not including tapered ends 64E and 66E) extend well underneath surface 20 when conveyor belt 18 has moved all the way to one end or the other of turning bar 22.

Rods 64 and 66 have respective tapered ends 64E and 66E formed to reduce the possibility of wear on conveyor belt 18 as it slides over the tops of rods 64 and 66. To avoid having conveyor belt 18 contact a right-angle end of rods 64 and 66, tapered ends 64E and 66E may for example be formed by saw-cutting rods 64 and 66 at an angle to their length and then smoothing, rounding, or bland sanding at least the top edges of the cut. Tapered ends 64E and 66E are preferably arranged so that the taper slopes down toward the center of turning bar 22. The separation between rods 64 and 66 and their ends 64E and 66E defines a central gap 68 of length G, through which water 62 flows from orifices 69 toward region 46.

Reservoir 60 quiescently holds water 62 up to a level even with the level of top 22H and thus a distance H below the level of top 52H. Further flow of water 62 through feed bar 52 to reservoir 60 is begun when conveyor belt 18 is placed in motion. As water 62 enters reservoir 60, and as conveyor belt 18 rises above region 46, the level of water 62 in reservoir 60 rises until it contacts surface 20 at least in region 46 and also fills region 46 with water. Turning bar 22 thus forms a weir over whose top 22H water 62 flows as water is added to reservoir 60 through feed bar 52. The rising of conveyor belt 18 tends to move its line 22L of first contact with turning bar 22 to a level lower than top 22H; as a result, water 62 flows over top 22H and contacts surfaces 20 and 22T at contact line 22L. As conveyor belt 18 advances over active surface 22T, water 62 is entrained between surfaces 20 and 22T and carried around turning bar 22 between those surfaces. That entrained water 62 lubricates surfaces 20 and 22T. The flow of water 62 in from feed bar 52 is adjusted to assure that surfaces 20 and 22T remain adequately lubricated. Water 62 that adheres to surface 20 before surface 20 contacts turning bar 22, but that is not entrained between surfaces 20 and 22T, is in effect "squeegeed off" of surface 20 and thus remains in region 46 available to be entrained later.

Rods 64 and 66 prevent water 62 from flowing directly over top 22H in regions of top 22H that conveyor belt 18 does not contact. Some water 62 does flow in those regions from region 46 out from under the edges of conveyor belt 18 and thence along and down the surface of turning bar 22 in direction 14, but that flow of loss water is considerably less than the volume of wasted water 50 that drips or flows from region 46 in the spray system (FIG. 1). The supply of water 62 through feed bar 52 is regulated by the volume control to reduce the flow of loss water to an acceptable amount. Much of the flow of loss water may be captured in a catch pan or pans 72 extending underneath turning bar 22.

In the spray system non-entrained water is lost as wasted water 50 from the entire width of, and in both directions over, turning bar 22. In a lubricating system according to the invention non-entrained water is lost only as it flows as loss water from region 46 over turning bar 22 in movement direction 14. The invention thus eliminates much of the water waste present in the spray system.

In an inspection system according to the invention support bar 23' with its surface 58, feed tube 52, side walls 54 and 56, rods 64 and 66, and threaded fitting 70 of FIGS. 2–3 replace support bar 23 and spray pipe 44 of FIG. 1; reservoir 60 with lubricant 62 of FIGS. 2–3 replaces spray 48 of FIG. 1.

The following example illustrates parameters of a lubrication system according to the invention that produced good results. Turning bar 22 was a rod of ¾-inch (approximately 19.1 millimeters) outside diameter 17-4 prehardened stainless steel. Rods 64 and 66 were of 3-16 grade stainless steel, had an outside diameter of approximately 0.25 inch (6.4 millimeters), and were each approximately 2.5 inches long (7.6 centimeters). Central gap 68 had a width G of approximately 48 inches (1.22 meters). Conveyor belt 18 was about 51⅜ inches (1.3 meters) wide and had an operating speed of approximately 500 feet (152 meters) per minute. Surface 20 had an internal fabric-like webbing and was covered with a layer of white polyurethane plastic. Reservoir 60 had a front depth of approximately 0.100 to ⅛ inch (2.5 to 3.2 millimeters) and a back depth of approximately 0.5 inch (12.7 millimeters), each measured from lower surface 58 to top 52H of feed bar 52. Feed bar 52 was ¾-inch IPS Schedule 80 steel pipe with a wall thickness of approximately ⅛ inch (3.2 millimeters). Distance D was approximately 3.5 inches (8.9 centimeters). Distance H was approximately 0.100 to ⅛ inch (2.5 to 3.2 millimeters). Orifices 69 were holes drilled through the side wall and diametrically toward centerline 52C of feed bar 52 with a 0.078 inch or 5/64 inch (approximately 2 millimeters) bit diameter drill. Orifices 69 were at a uniform level and spaced approximately every 3 inches (7.6 centimeters) beginning approximately four inches (10.2 centimeters) in from side walls 54 and 56; thus, fifteen orifices 69 were provided. Feed bar 52 was installed so that an imaginary line 69C connecting the center of orifices 69 with centerline 52C aimed directly at region 46. Lubricant 62 was tap water. The supply of water was adjusted by observation so that a small amount of water flowed over the tops 64H and 66H of rods 64 and 66.

The invention is also useful in a system (such as an inspection system operable to determine characteristics of articles in motion through an inspection region according to optical analysis of optical characteristics of the articles) in which the articles are to be transferred through a desired region 26 other than an inspection region or treatment region. For example, the invention is useful in lubricating a turning element of a belt-to-belt transfer system in which a non-rotating turning element is used in connection with a first conveyor belt that transfers articles to a surface of equal or lower elevation of a second conveyor belt. Uses of such belt-to-belt transfer systems include transferring articles 12 (for example, delicate or easily-bruised articles) from one conveyor belt 18 to another conveyor belt with a low or minimum vertical drop from surface 16 of conveyor belt 18 to the upper surface of another conveyor belt.

Although the invention has been described with reference to an optical inspection system such as an automated bulk processing system, the invention is also useful in any other application in which the inner surface of a conveyor belt is to be lubricated as it passes over or around a turning bar or other conveyor belt support element, whether the turning bar or support element is fixed or rotatable. Lubricant 62 has been described as water but may, depending on the context in which the invention is applied, alternatively comprise water or another aqueous solution, a light oil, or other lubricating substances.

It will be apparent to skilled persons that many changes may be made to details of the specific embodiments of the invention described herein without departing from the underlying principles thereof. The scope of the invention should, therefore, be determined only by the following claims.

We claim:

1. An inspection system operable to determine characteristics of articles in motion through an inspection region according to automated analysis of optical characteristics of the articles and to treat in a treatment region selected ones of the articles determined to have predetermined optical characteristics, comprising:

a turning element disposed adjacent the treatment region and having first and second ends, a turning surface, a free surface, and a top;

a conveyor belt operable to cause the articles to move through the treatment region, the belt having an outer surface for supporting the articles and an inner surface in contact with the turning surface, the contact beginning along a contact line;

a plurality of barriers defining, with the free surface, a reservoir to contain a lubricant and that extends the width of the turning element, the barriers having respective tops at least a first distance above the top of the turning element; and means for supplying a lubricant to the reservoir in sufficient quantity to fill the reservoir to above the top of the turning element, and to replace lubricant entrained between the inner surface and the turning surface during operation of the system, so that the contact line is and remains submerged in the lubricant, whereby the inner surface and the turning surface are in contact with the lubricant along the contact line.

2. The system of claim 1, wherein the belt is of a character that the inner surface rises up the first distance above the top of the turning element when the system is in operation.

3. The system of claim 1, wherein the barriers comprise first and second side walls, and further comprising first and second containment baffles disposed between the turning element and the inner surface and extending transversely from near one of the sides toward the other of the sides and upwardly between the turning element and the inner surface, each baffle having a free end spaced apart from the free end of the other baffle, the spaced apart free ends defining a central gap of a character that allows the lubricant to flow over the top of the turning element.

4. The system of claim 1, wherein the plurality of barriers comprises first and second side walls, and further comprising first and second containment baffles disposed between the turning element and the orifices and extending transversely from near respective first and second sides of the belt toward the center of the belt and upwardly between the turning element and the inner surface, each baffle having a free end spaced apart from the free end of the other baffle and a main portion extending from the respective side wall, the main portion of each baffle longer than a maximum separation between a side of the belt and the nearest side wall.

5. The system of claim 1, wherein the means for supplying a lubricant comprises a tube having a free surface defining a plurality of orifices, the orifices disposed along a direction generally transverse to the direction of belt movement, and the plurality of barriers comprises the free surface of the tube.

6. The system of claim 5, wherein the orifices are further of a character that directs the discharge upward toward the contact line.

7. The system of claim 6, wherein the plurality of barriers comprises:

a first side wall extending from the free surface of the turning element in a direction opposite the movement direction; and a second side wall extending from the free surface of the turning element in a direction opposite the movement direction;

a floor joined to the first and second side walls and to the free surface; and a back wall joined to the first and second side walls and to the floor and defining or supporting the orifices.

8. The system of claim 7, wherein the floor slopes downward from the turning element in the direction opposite to the movement direction.

9. The system of claim 7, wherein the back wall comprises a free surface of a feed bar, the free surface defining the orifices.

10. An inspection system operable to determine characteristics of articles in motion through an inspection region according to automated analysis of optical characteristics of the articles and to transfer the articles through a desired region, comprising:
- a turning element disposed adjacent the desired region and having first and second ends, a turning surface, a free surface, and a top;
- a conveyor belt operable to cause the articles to move through the desired region, the belt having an outer surface for supporting the articles and an inner surface in contact with the turning surface, the contact beginning along a contact line;
- a plurality of barriers defining, with the free surface, a reservoir to contain a lubricant and that extends the width of the turning element, the barriers having respective tops at least a first distance above the top of the turning element; and
- means for supplying a lubricant to the reservoir in sufficient quantity to fill the reservoir to above the top of the turning element, and to replace lubricant entrained between the inner surface and the turning surface during operation of the system, so that the contact line is and remains submerged in the lubricant, whereby the inner surface and the turning surface are in contact with the lubricant along the contact line.

11. The system of claim 10, wherein the belt is of a character that the inner surface rises up the first distance above the top of the turning element when the system is in operation.

12. The system of claim 10, wherein the barriers comprise first and second side walls, and further comprising first and second containment baffles disposed between the turning element and the inner surface and extending transversely from near one of the sides toward the other of the sides and upwardly between the turning element and the inner surface, each baffle having a free end spaced apart from the free end of the other baffle, the spaced apart free ends defining a central gap of a character that allows the lubricant to flow over the top of the turning element.

13. The system of claim 10, wherein the plurality of barriers comprises first and second side walls, and further comprising first and second containment baffles disposed between the turning element and the orifices and extending transversely from near respective first and second sides of the belt toward the center of the belt and upwardly between the turning element and the inner surface, each baffle having a free end spaced apart from the free end of the other baffle and a main portion extending from the respective side wall, the main portion of each baffle longer than a maximum separation between a side of the belt and the nearest side wall.

14. The system of claim 10, wherein the means for supplying a lubricant comprises a tube having a free surface defining a plurality of orifices, the orifices disposed along a direction generally transverse to the direction of belt movement, and the plurality of barriers comprises the free surface of the tube.

15. The system of claim 14, wherein the orifices are further of a character that directs the discharge upward toward the contact line.

16. The system of claim 15, wherein the plurality of barriers comprises:
- a first side wall extending from the free surface of the turning element in a direction opposite the movement direction; and
- a second side wall extending from the free surface of the turning element in a direction opposite the movement direction;
- a floor joined to the first and second side walls and to the free surface; and
- a back wall joined to the first and second side walls and to the floor and defining or supporting the orifices.

17. The system of claim 16, wherein the floor slopes downward from the turning element in the direction opposite to the movement direction.

18. The system of claim 16, wherein the back wall comprises a free surface of a feed bar, the free surface defining the orifices.

19. The system of claim 10, wherein the desired region comprises a surface of a second conveyor belt.

* * * * *